(12) United States Patent
Schulte et al.

(10) Patent No.: US 6,749,791 B1
(45) Date of Patent: Jun. 15, 2004

(54) STRUCTURED SURFACE PRODUCTION AND USE OF SAME

(75) Inventors: Axel Schulte, Holzgerlingen (DE); Jan Tuma, Berlin (DE)

(73) Assignee: Gottlieb Binder GmbH & Co., Holzgerlingen (DE)

( * ) Notice: Subject to any disclaimer, the term of this patent is extended or adjusted under 35 U.S.C. 154(b) by 0 days.

(21) Appl. No.: 10/070,310

(22) PCT Filed: Aug. 17, 2000

(86) PCT No.: PCT/EP00/08034
§ 371 (c)(1),
(2), (4) Date: Mar. 5, 2002

(87) PCT Pub. No.: WO01/19597
PCT Pub. Date: Mar. 22, 2001

(30) Foreign Application Priority Data

Sep. 10, 1999 (DE) .......................... 199 43 299

(51) Int. Cl.⁷ .............................................. B29C 43/22
(52) U.S. Cl. .................... 264/284; 264/293; 425/385
(58) Field of Search ................... 264/284, 293; 425/385

(56) References Cited

U.S. PATENT DOCUMENTS

| | | | | |
|---|---|---|---|---|
| 4,016,628 A | * | 4/1977 | Kolbach | 19/148 |
| 4,128,612 A | * | 12/1978 | Roth | 264/126 |
| 4,250,135 A | * | 2/1981 | Orsini | 264/227 |
| 4,275,768 A | * | 6/1981 | Riggs et al. | 138/104 |
| 5,202,173 A | * | 4/1993 | Wu et al. | 428/131 |
| 5,296,184 A | * | 3/1994 | Wu et al. | 264/154 |
| 6,488,570 B1 | * | 12/2002 | James et al. | 451/36 |
| 2002/0127372 A1 | * | 9/2002 | Waite et al. | 428/172 |

FOREIGN PATENT DOCUMENTS

| | | |
|---|---|---|
| DE | 3524653 | 1/1986 |
| DE | 19943299 | 3/2001 |
| EP | 0846617 | 6/1998 |
| EP | 0772514 | 12/1998 |
| EP | 0933388 | 8/1999 |
| WO | 9301047 | 1/1993 |
| WO | 9604123 | 2/1996 |

* cited by examiner

*Primary Examiner*—Mark Eashoo
(74) *Attorney, Agent, or Firm*—Roylance, Abrams, Berdo & Goodman, LLP

(57) ABSTRACT

A surface for an object has base structure (10) which can be synthetically produced, a first type of projections (12) and a second type of projections (16). The projections of each respective type lie adjacent to one another. This structural surface provides a self-cleaning surface which is cost-effective to produce and has excellent dirt-resistant properties. The adjacent projections of the first type (12) are in close contact with one another. The projections of the first and second types (12, 16) are located on a common side, facing away from the object. The projections of the second type (16) are arranged on the projections of the first type. The invention also relates to a method for producing the surface and to its use.

13 Claims, 3 Drawing Sheets

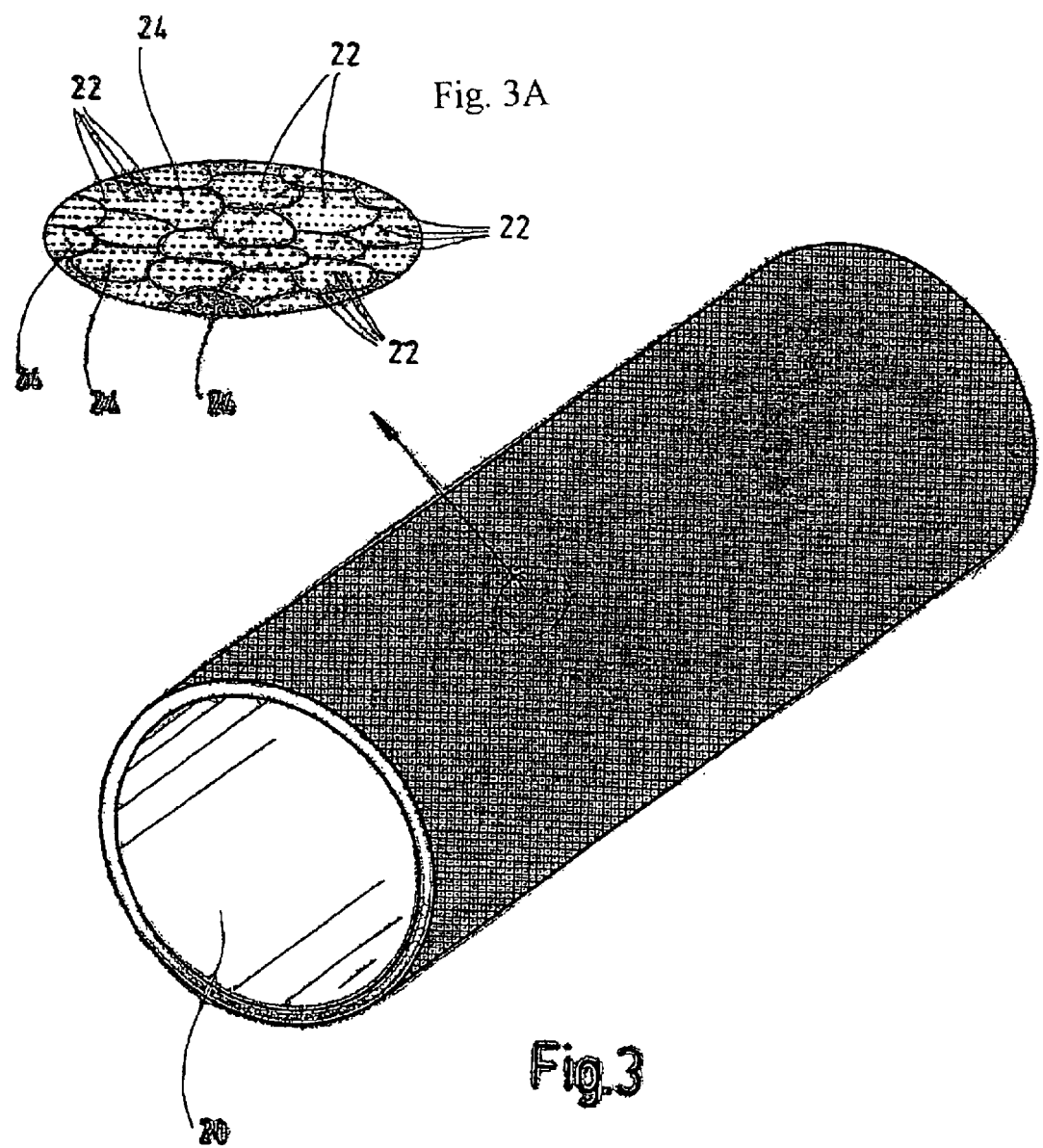

US 6,749,791 B1

STRUCTURED SURFACE PRODUCTION AND USE OF SAME

FIELD OF THE INVENTION

The present invention relates to a method for producing a surface for an object having a base structure with two types of projections. Projections of a similar type are arranged adjacent one another. The first type of projections contact one another without spacing. The second type of projections are arranged on the projections of the first type. Furthermore, the present invention relates to a device for execution of the method as well as to the surface itself and its use.

BACKGROUND OF THE INVENTION

DE 35 24 653 C2 discloses surfaces in the form of embossed, biaxially laid out foils forming an apertured grid-like cloth as an article with openings and webs. Its elevated areas are rounded off and deformed, each as a sort of projection, forming a web component part incorporated within the cloth structure. The manufacture of apertured netted cloths by embossment of a foil of thermoplastic polymers using such a known solution leads to improved properties regarding its grip and, with corresponding subsequent treatment, leads to reduction of undesirable shiny effects of the material.

EP 0 772 514 B1 discloses self-cleaning surfaces of articles which have a synthetic surface structure having projections and recesses. The spacing between the projections is in the range of 5 to 200 micrometers. The height of the projections is in the range of 5 to 100 micrometers. In addition, at least the projecting parts are of hydrophobic polymers or other materials which are made permanently hydrophobic. The projections cannot be loosened and peeled off by water or by water with detergents added thereto.

The known solution shows a surface with these projections for repelling contaminants, whereby a simulated lotus-petal structure is synthetically constructed. It is known that it is not contaminated because of the capacity of the structure for self-cleaning. Even commercial adhesives are removable from the biological structure. Despite remarkable results with regard to a self-cleaning effect, such known surfaces can be used only in a limited manner, since either the range of materials which can be used in the production is greatly limited or the surface must be treated by further processing for the purpose of making it hydrophobic, which is costly. Also, the known surface can be produced only at high cost, while incurring considerable complications. For production of the known surface, coating methods or shaping methods are provided using high-grade mesh screens, which are costly and difficult to produce. Also, in practice, it has been shown that such synthetically produced surfaces with 'lotus effect' often do not produce the desired results.

PCT/WO 93/01047 discloses a surface having a deeply embossed, thermoplastic film. This film surface includes a plurality of macroscopic cells as first projections, which are connected by the areas extending between these adjacent macroscopic cells. The macroscopic cells have a depth of 0.635 to 3.8 mm. In addition, the thermoplastic film incorporates a plurality of microscopic indentations, which construct a fortuitously distributed sandblast pattern on the film, with a spacing between 1.25 and 7.35 micrometers. These microscopic indentations form a second type of projection, which projections have an opposite orientation to the projections of the first type. The projections are arranged according to types separated from one another on opposite sides of the surface. Such known surfaces, usually in the form of polyolefin foils, such as surfaces of polyethylene, are particularly used in those cases, with projections of a raised area extending between them. In particular, requirements are set on such cloth material relating to esthetic or visual sense-perceptions, in other words for use in the field of linings of clothing or in hygienic or sanitary areas. Also, the surfaces have no dirt-repelling properties, so that a self-cleaning effect is not demonstrable in this case.

EP 0 933 388 A2 discloses a structured surface with hydrophobic and/or oil-resistant properties with low surface charges. The known surfaces have high boundary or rim angles with water and are cleaned with water only with difficulty and therefore include a self-cleaning effect. In order to attain this structure surface, a synthetically producible base structure is provided with two different types of projections. A type of smaller projections are mounted on a superstructure in the form of projections of large dimensions mounted and in direct contact adjacent to one another. For the production of the known projections and the superstructure as an another type of projections, these projections either simultaneously or in sequence are mechanically impressed or embossed into the surface material, etched in by lithographic method or obtained by shaping processing by means of applied or casting technology. With the mechanical imprinting or embossing method, it is worked from the reverse side forward on the surface, which then on its opposite side shapes out the aforementioned two types of projections. With etching of the structure into the surface material, the damage resulting from the etching medium is to be calculated at least in part. With the surface shaping method, first of all the relevant projection structure is applied on the surface by means of an application roll applied to the surface material. The last method is expensive and cost-intensive and does not guarantee that, dependent upon the stress, the structure mounted thereon in this manner does not become detached from the base material. The known casting, imprinting or embossing, etching and surface application methods are therefore not suitable in large-scale measure to make available the production of large quantities of structured surfaces.

SUMMARY OF THE INVENTION

Objects of the present invention are to provide an improved method for the production of synthetic surfaces having two different types of projections, so that they can be made at lower cost, and reasonably large volumes of surfaces can be made available by use of finishing techniques, with the surface particularly having a very good repelling capacity for contaminants.

Another object of the present invention is to provide a surface produced according to the method and the device, as well as its use.

The foregoing objects are basically obtained by a method for producing a self-cleaning hydrophilic surface on an article, comprising the steps of supplying hydrophilic plastic material to a structure and shaping roll having a first type of recesses and a second type of recesses, and continuously producing first and second types of projections on a common side of a base structure facing away from the article. The projections are produced with the projections of a similar type being adjacent one another, with adjacent projections of the first type contacting one another without spacing and with the second type of projections on the projections of the first type, and are produced from the plastic material penetrating into the first and second types of recesses which correspond to the first and second types of projections, respectively, as a foil or strip material.

With the method of shaping out by means of a structure and shaping roll having recesses to shape out the convex projections, the dirt-repelling surface can be made uniformly and cost effectively in large quantities by use of manufacturing technology.

Preferably the structure and shaping roll are configured so that, particularly with use of a backing roll, a shaping gap is formed, through which the synthetic material passes. Dependent upon the width and the diameter of the structure and shaping roll, the desired surfaces can be produced in any desired length and width. Insofar as the backing roll is configured as a shaping roll with a structure comparable to that of the structure and shaping roll, the desired microscopic surface structure can be produced on both sides. The synthetically producible base structure then penetrates into the surface of the structure and shaping roll for its shaping, and then immediately leaves the structure and shaping roll as finished product. By the use of hydrophilic plastic material for the base structure, an improved dirt-repelling degree can be attained relative to the known hydrophilic and/or oil-resistant structures.

The recesses for the structure and shaping roll can be obtained by a sandblast method. Using a stream of material of larger diameter and another stream of smaller diameter, the recesses for the first type of projections and the second type of projections are formed. The stream of material can be provided on its granular surface with further projections which form the recesses for the projections of the first type. The resulting sandblast methods are very cost effective and offer the required precision for the subsequent projection structures of the structured surface. The synthetic base structure which is obtained finds its equivalents in nature, for example, in the leaves of the nasturtium. Earlier research has shown that the nasturtium has an extremely fine ultrastructure regarding its leaves, with structural elements in the form of projections which are shorter than 12 micrometers. Such surface structures, which were not known in detail (cf. EP 0 772 514 B1, column 1, lines 4ff), were assumed to not be synthetically producible and considered in relation to their mechanical resistance capacity as extremely sensitive and consequently as unsuitable in terms of practical importance. On the other hand, it was seen in technical terms as simple to understand the lotus leaf structure as the natural pattern. It is consequently surprising for the expert in the art that on the one hand the extremely fine ultrastructure of the biological prototype of the nasturtium has succeeded as ascertainable, and on the other hand to complete the synthetic construction thereof and to develop that construction further into a product which has a very good dirt-repelling property and unexpectedly has the mechanical stability required for such a product.

The basic structure of the surface is indicated by a smooth lotus leaf structure, on which the projections are arranged protruding outward in such a manner that the basic structure is not flat. Rather, convex projections have been constructed on the basic structure. In turn, the smaller projections are mounted on the convex projections as integral component parts. Such structured surfaces are also indicated in terms of the foils disclosed in PCT/WO 93/01047 and DE 35 24 653 C2. Due to the fact that the first type of projections stands away each as a convex curve from the base structure of the surface, then, as opposed to a smooth structure, a considerably enlarged surface for the mounting of the second type of projections is made available. Despite the doubts inherent in technology, such surfaces according to the present invention can be constructed in good form at low cost in large quantities of surface. The produced surface is mechanically stable, even under corresponding high stresses applied to the surface or the base structure. Due to the fact that the projections of the first type are arranged in contact with one another on the surface of the present invention in such a manner that the adjacent projections of the first type engage on one another in close contact, and that they also are cut down clearly smaller than the known orders of magnitude of the dimensions in the case of the lotus leaf solution found in EP 0772 514 B1, if the occasion arises, an improved repelling behavior to repel polluting particles is provided, since these features can be incorporated between the projections on the basic structure without further steps.

Preferably polyvinyl chloride, polyterephthalate, polymethyl methacrylate or polyamide are used as hydrophilic synthetic materials for the base structure.

Due to the fact that, with one preferred embodiment of the surface according to the present invention, the second type of projections stands out gudgeon-like from the first type of projections. The relevant projection of the second type is in terms of height shorter than 5 micrometers or between 1.5 and micrometers. The spacing between the projections of the second type is likewise smaller than 5 micrometers, preferably 1 to 3 micrometers. A surface of microscopic structure is suitable for use with adhesive closings, wherein hook elements of two closing parts cooperate with one another or hook elements of a closing part cooperate with loop material of another part.

The surface according to the present invention can be used particularly for articles to prevent their unwanted contamination. Also, the projections of the first type are arranged in close contact adjacent to one another so that contamination particles of average dimensions impacting on the surface cannot come in contact with the surface between the projections. Furthermore, the surface can be subjected to a current, for example an air or water current, so that in the main direction of the current, turbulence occurs because of the projections. Surprisingly, a lowering of the wall friction occurs. Such surfaces having rib structures can be used for this purpose in the state of the art (cf. for example EP 0 846 617 A2).

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 3 is a perspective view of a structure and shaping roll according to the present invention for producing the surfaces of FIGS. 1 and 2; and FIG. 3A is an enlarged section of the structure and shaping roll of FIG. 3.

DETAILED DESCRIPTION OF THE INVENTION

Figure 1:
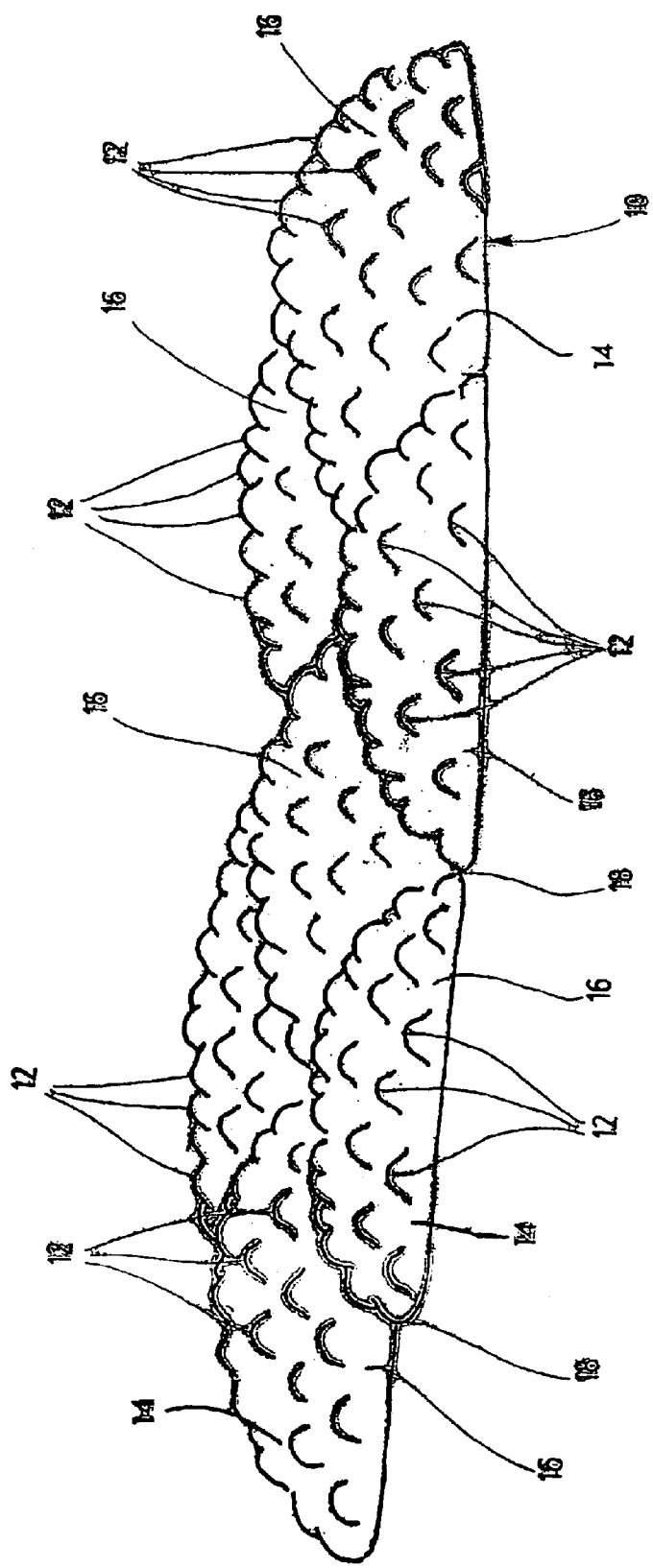
FIG. 1 is a side elevational view in section of a surface according to the present invention.
Figure 2:
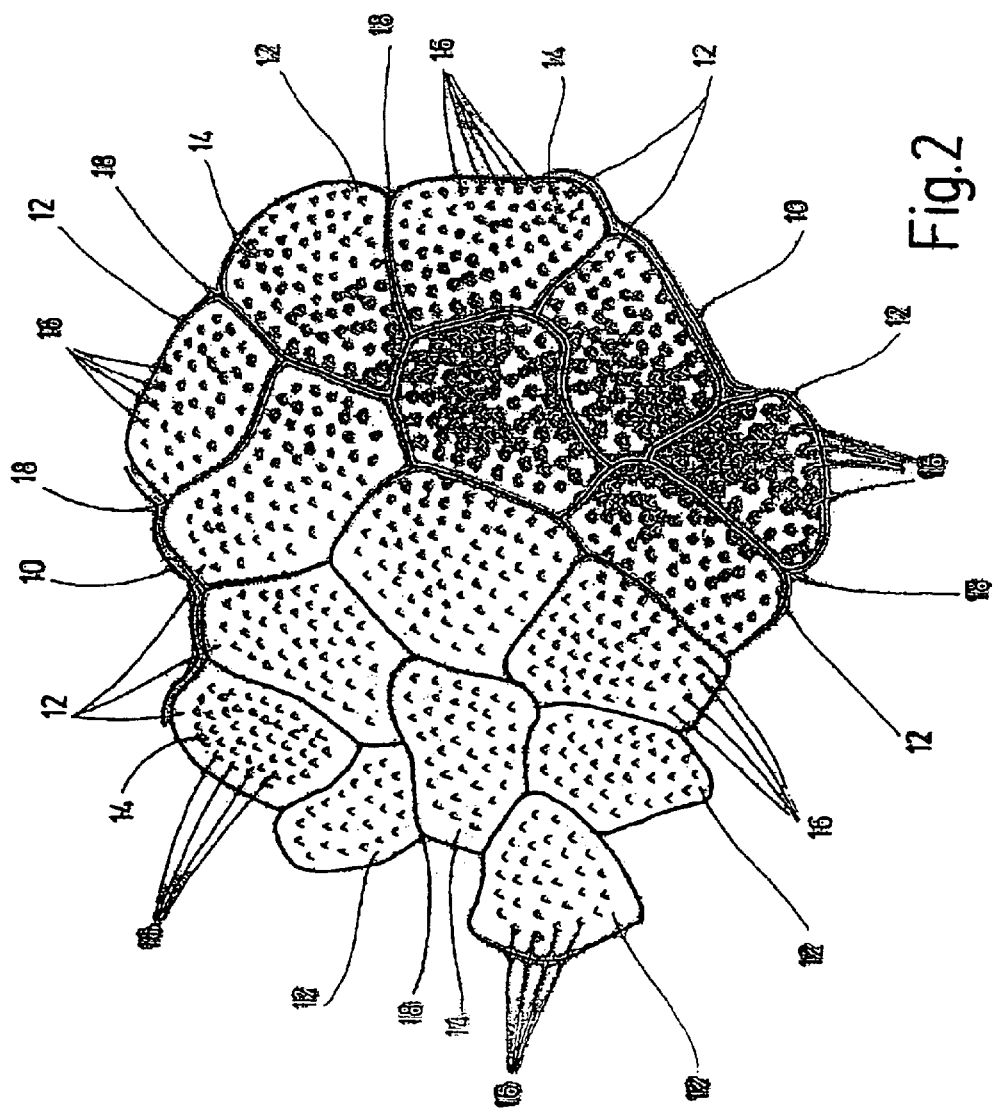
FIG. 2 is a plan view of the surface of FIG. 1.

The surface shown in FIGS. 1 and 2 is for an object not described in greater detail, and incorporates a synthetically produced base structure 10. At some spacing from base structure 10, a second type of projections 16 protrudes from the first type of projections 12 adjacent and engaging with one another in close contact. The second type of projections 16 are limited from the first type of projections 12 by areas 14, FIG. 2. The resulting first type of projections 12 is configured to be convexly elevated as compared with the basic structure 10, and, as shown in FIG. 1, forms closed off mounds in and of itself. From observation of FIGS. 1 and 2, it is to be noted that the projections are microscopic structures, and the illustrated representation greatly enlarges the effective conditions being represented to greatly simplify the picture. Particularly, the spaces between the projections are shown only in principle, in order to clarify the sense of the invention. As FIGS. 1 and 2 further show, projections 16 of the second type are arranged on the first type of projections 12. Consequently, on the side turned away from the article, projections 16 form integral component parts of projections 12, with which they are integrally connected.

Basic structure 10 is formed of a synthetic material, preferably of a hydrophilic plastic material, such as polyvinyl chloride, polyterephthalate, polymethyl methacrylate or polyamide. As FIGS. 1 and 2 further show, the second type of projections stand projecting gudgeon-like beyond the first type of projections 12. The relevant projection 16 of the second type is of a height shorter than 5 micrometers, preferably between 1.5 and 3 micrometers. The spacing between projections 16 of the second type likewise is smaller than 5 micrometers, preferably 1 to 3 micrometers. The respective height is measured from foot to apex point of each projection 16. The spacing of projections 16 from one another is the average spacing between the exterior peripheries of projections 16. As can be seen particularly from FIG. 2, the relevant convexly configured projection 12 of the first type has a surface on the base structure 10 of between 20 and 300 micrometers$^2$. The height between base structure 10 and the apex of the relevant projection 12 of the first type is between 10 and 50 micrometers. The limitable areas 14 form a sort of cluster structure. Areas 14 are in contact with one another essentially directly along connection lines 18.

A production method using a shaping or structure roll 20 is used for the production of the aforementioned surface, and shown in FIG. 3 in its principle construction. Using grooved roll 20, it is possible to continuously produce the surface out of synthetic material as foil or strip material. Shaping or structure roll 20 is provided with recesses 22 and 24 corresponding to the first and second types of projections 12, 16, into which the synthetically producible basic structure 10 penetrates in order to be shaped. In FIG. 3A, an enlarged section of the surface of shaping or structure roll 20, shows the corresponding recesses 22, 24. Preferably, a sandblast method is used to produce the resulting recess structure for shaping or structure roll 20. Sandblasting granules of enlarged diameter greater form concave recesses 24 serving for the production of the first type of projections 12. A blast material of smaller diameter within recesses 24 shape the other recesses 22 serving for the production of the second projections 16. Instead of blasting material with various dimensions, it is also possible to use also only blasting material which on its granular surface is provided with further projecting components, which further projecting components form the recesses 22 for projections 16 of the second type. The resulting sandblasting methods are very cost effective and offer the required precision for the subsequent projection structures for the surface of the invention.

Shaping or structure roll 20 can be configured as a hollow cylinder and particularly can be heated, insofar as the plastic material to be treated makes this necessary. When another support roll (not shown) is incorporated, shaping or structure roll 20 then forms a profiling gap through which the plastic material passes. Dependent upon the width and diameter of shaping or structure roll 20, the desired surfaces can be produced in desired lengths and widths.

The surface thus produced can be used particularly in order to prevent the contamination of the covered articles. Projections 16 of the second type are arranged standing closely adjacent to one another, so that the free spaces between these projections 16 are smaller than the average dimensions of the contamination particles impinging on the surface.

The materials provided for the production of the surface for an article can be formed of regrowth-capable raw materials and are preferably biodegradable. The final regulation in this case is the DIN V 54900. Polyactides have been shown to be particularly suitable for the surface material.

While one embodiment has been chosen to illustrate the invention, it will be understood by those skilled in the art that various changes and modifications can be made therein without departing from the scope of the invention as defined in the appended claims.

What is claimed is:

1. A method for producing a self-cleaning hydrophilic surface on an article, comprising the steps of:

supplying hydrophilic plastic material to a structure and shaping roll having a first type of recesses and a second type of recesses; and continuously producing first and second types of projections on a common side of a base structure facing away from the article, with the projections of a similar type being adjacent one another, with adjacent projections of the first type contacting one another without spacing and with the second type of projections on the projections of the first type, from the plastic material penetrating into the first and second types of recesses which correspond to the first and second types of projections, respectively, as a foil or strip material.

2. A method according to claim 1 wherein the recesses in the structure and shaping roll are formed by sandblasting with blasting material of a larger diameter and of a smaller diameter for the first and second types of recesses, respectively.

3. A method according to claim 2 wherein the plastic material is polyvinyl chloride, polyterephthalate, polymethyl methacrylate or polyamide.

4. A method according to claim 1 wherein the recess in the structure and shaping roll are formed by sandblasting with blasting material having granular surfaces with further projections, which further projections forming the recesses of the second type.

5. A method according to claim 4 wherein the plastic material is polyvinyl chloride, polyterephthalate, polymethyl methacrylate or polyamide.

6. A method according to claim 1 wherein the plastic material is polyvinyl chloride, polyterephthalate, polymethyl methacrylate or polyamide.

7. A method according to claim 1 wherein the second type of projections protrude as gudgeons from the first type of projections with the second type of projections having heights less than 5 micrometers and relative spacings less than 5 micrometers.

8. A method according to claim 7 wherein the heights are between 1.5 and 3 micrometers.

9. A method according to claim 8 wherein the relative spacings of the second type of projections is 1 to 3 micrometers.

10. A method according to claim 7 wherein the relative spacings of the second type of projections is 1 to 3 micrometers.

11. A method according to clam 1 wherein the projections of the first type are formed to rise convexly from the base structure to peak heights between 10 and 50 micrometers and to have surfaces on the base structure of between 20 to 300 square micrometers.

12. A method according to claim 1 wherein limitable areas of the projections of the first type are formed as cluster structures.

13. A method according to claim 1 wherein the projections of the second type are formed in close proximity to one another with free spaces between the projections of the second type being smaller than average diameters of contamination particles impinging thereon.

* * * * *